United States Patent [19]
Sayer

[11] 3,805,587
[45] Apr. 23, 1974

[54] METHOD AND APPARATUS FOR LOCATING GEOTHERMAL SOURCES OF ENERGY

[76] Inventor: Wayne L. Sayer, 2851 N. Inyo, Bakersfield, Calif. 93305

[22] Filed: Jan. 22, 1973

[21] Appl. No.: 325,657

Related U.S. Application Data

[63] Continuation-in-part of Ser. No. 233,933, March 13, 1972, abandoned.

[52] U.S. Cl............. 73/15 R, 73/154, 73/432 R, 181/.5 BE, 181/.5 NP
[51] Int. Cl. .................... E21b 49/00, G01h 25/00
[58] Field of Search........ 23/230 EP; 73/15 R, 15.4, 73/154, 432 R; 181/.5 BE, .5 NP

[56] References Cited
UNITED STATES PATENTS
2,403,704  7/1946  Blau....................................... 73/432
3,217,550  11/1965  Birman ................................ 73/432

Primary Examiner—Herbert Goldstein
Attorney, Agent, or Firm—Huebner & Worrel

[57] ABSTRACT

A method and apparatus for locating subterranean sources of geothermal energy characterized by discharging test energy into the earth at a depth sufficient to be substantially insulated from surface temperature variations, removing heat from the earth at the discharge position to establish a sphere of cooling at the discharging position subject to heat from the geothermal source, and detecting changes in the conductivity of the earth between the discharging position and a plurality of detecting positions at or near the surface substantially equally spaced about an axis of reference extended from the discharging position vertically to the surface to determine the azimuthal orientation of the source of geothermal heat from the axis by changes in the conductivity of the earth between said discharging position and the detecting positions indicent to geothermal warming of the sphere of cooling.

21 Claims, 5 Drawing Figures

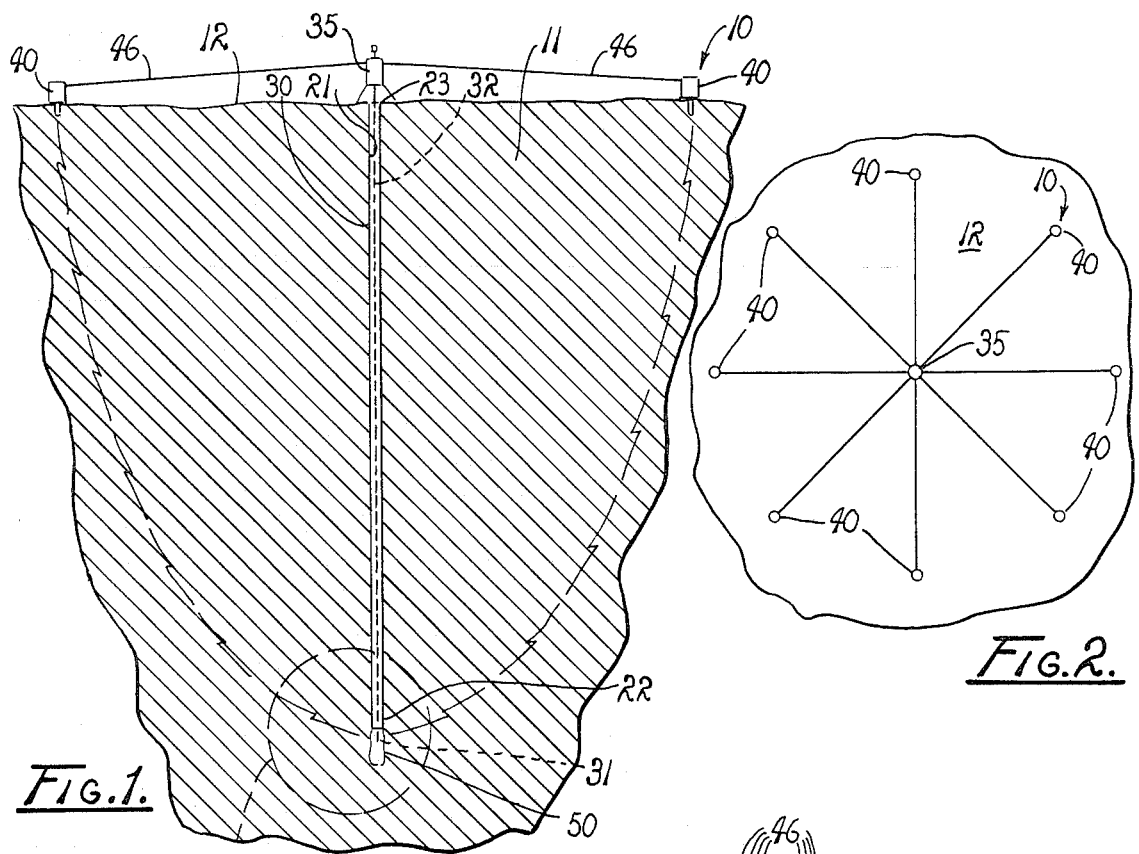
Fig.1.
Fig.2.
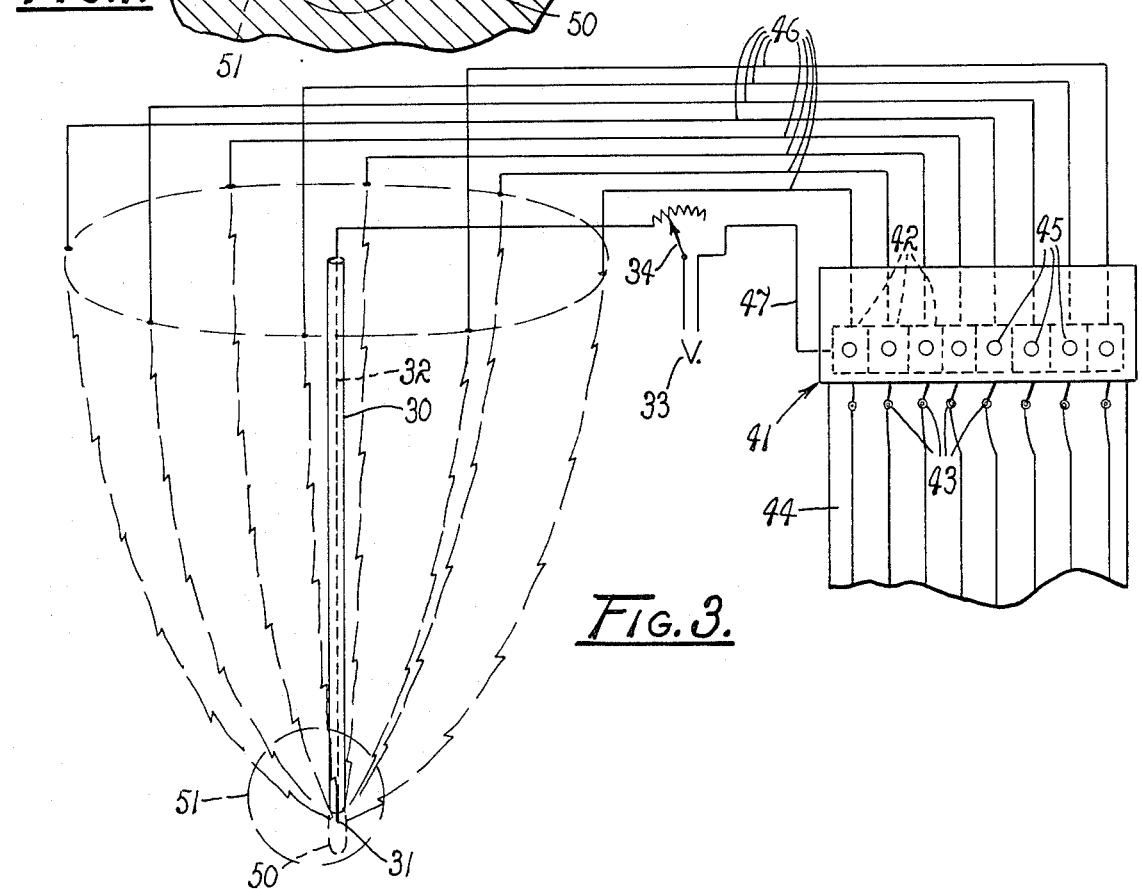
Fig.3.

3,805,587

METHOD AND APPARATUS FOR LOCATING GEOTHERMAL SOURCES OF ENERGY

CROSS REFERENCE TO RELATED APPLICATION

This application is a continuation-in-part of my copending application, Ser. No. 233,933, filed Mar. 13, 1972, now abandoned entitled A Method And Apparatus For Locating Geothermal Sources Of Energy.

BACKGROUND OF THE INVENTION

The present invention relates to a method and apparatus for locating geothermal sources of energy and more particularly to such a method and apparatus which accurately, efficiently and inexpensively locates subterranean sources of geothermal energy, such as steam for use in the production of electrical energy, and permits qualitative and quantitative evaluation of such sources once located.

It has long been recognized as desirable to utilize energy sources directly present in nature for the production of electrical energy in order to produce such energy as economically as possible. To that end, for example, hydroelectric energy is produced at available sources of water, such as lakes and rivers, from which gravitational outlfow can be utilized as a source of kinetic energy. However, relatively few promising sources of water for the production of hydroelectric energy remain untapped. Furthermore, the costs involved in harnessing such available sources by constructing aquaducts, hydroelectric dams, and the like render many such sources impractical for use.

One source present in quantity in nature, but as yet not utilized to the extent desired, is geothermal energy. Geothermal energy is energy in the form of heat having a subterranean source and frequently manifest in the form of hot water or steam. While the presence of such sources is often readily apparent on the surface in the form of geysers and fumaroles, it has not been commercially feasible to locate the sources themselves which lie at substantial depth below the surface due to the intricate tracery of underground passages and vents leading from the source to the surface. It is frequently the case that the sources not only lie at great depths in the earth but are also laterally disposed relative to their surface vents. Consequently, a considerable amount of drilling to great depths is ordinarily required to locate the source. Such drilling is often prohibitorily expensive as well as fruitless.

Yet because of the increasing demand for electrical energy, such untapped sources are becoming increasingly more attractive. Great amounts of money and effort have been expended in a fruitless attempt to develop a method by which such sources can be economically located and evaluated for potential use. The present invention is believed to solve this problem.

SUMMARY OF THE INVENTION

It is therefore an object of the present invention to provide a method and apparatus which permit accurate location of geothermal sources of energy lying at depths below the surface of the earth.

Another object is to provide such a method and apparatus which eliminate the necessity for drilling investigative boreholes to great depths in order to locate geothermal sources of energy.

Another object is to provide such a method and apparatus which are capable of locating geothermal sources of energy which are laterally disposed with respect to the apparatus.

Another object is to provide such a method and apparatus which make commercially feasible the use of geothermal sources of energy so as vastly to increase the available sources of electrical energy and to make possible the production of such energy at reduced cost to the consumer.

Another object is to provide such a method and apparatus which make possible the accurate location of such sources at a minimal expense.

Another object is to provide such a method and apparatus which is capable of utilizing a variety of forms of energy in probing for the geothermal source.

A further object is to provide such a method and apparatus which are capable of operation without hindrance from variable beneath the surface conditions.

A still further object is to provide such a method and apparatus which require the use of a minimal amount of special equipment at the site.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 1 is a schematic side elevation of the apparatus of the first form of the present invention showing it in its operative configuration within the earth.

FIG. 2 is a somewhat reduced schematic top plan view of the first form of the apparatus disposed in its operative configuration on the surface of the earth.

FIG. 3 is a schematic diagram of the first form of apparatus showing the electrical circuit thereof for the detection of investigative information.

DESCRIPTION OF A FIRST FORM

Figure 4:
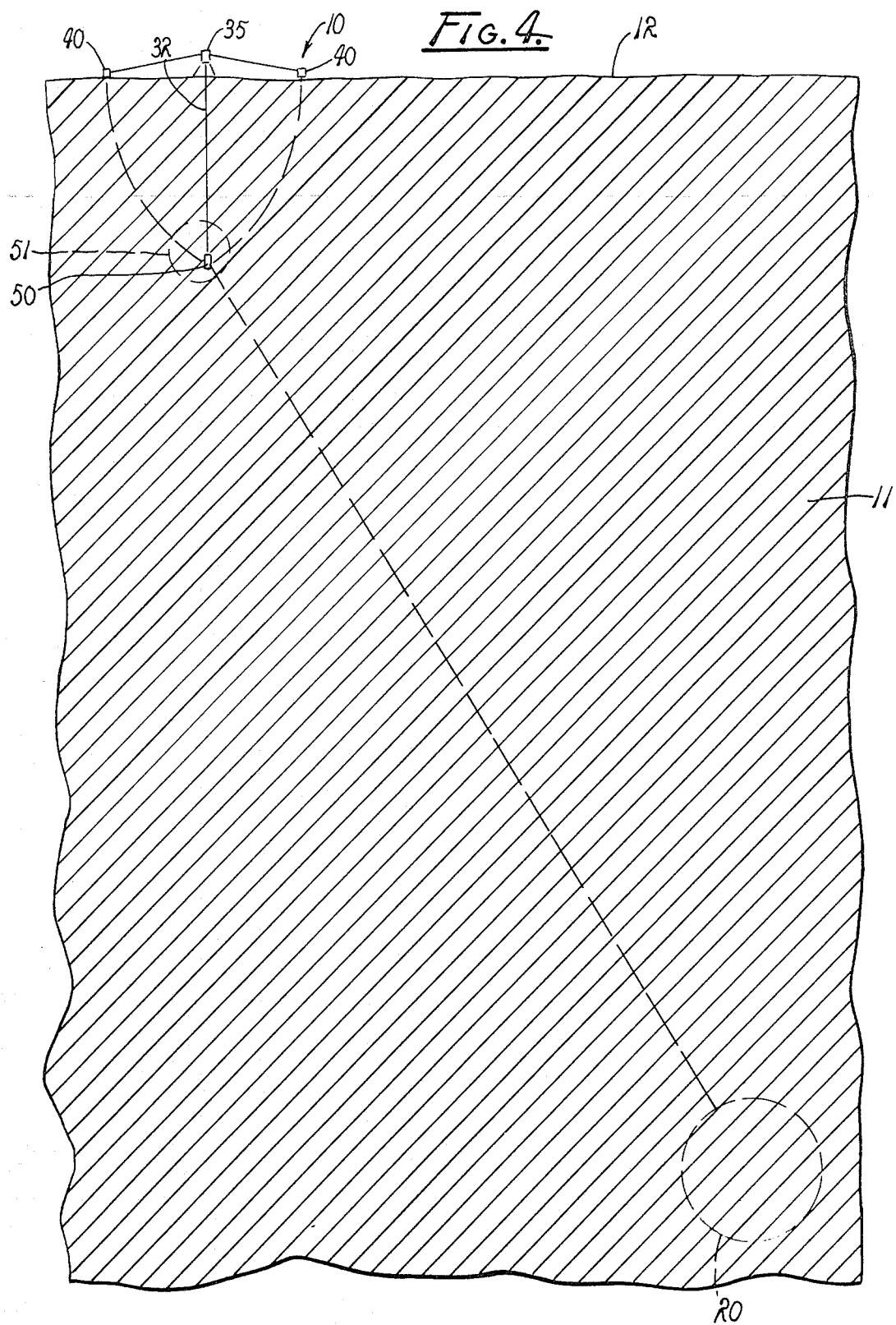
FIG. 4 is a schematic side elevation of the first form of apparatus showing it in its operative environment in the earth in relation to a geothermal source of energy.

Referring particularly to FIG. 1, an apparatus 10 embodying the principles of the first form of the present invention is shown in its operative environment. The apparatus is shown in position in the earth's crust 11 and disposed on and closely adjacent to the earth's surface 12. For illustrative convenience, the crust is shown in the drawings as a homogeneous composition of soil or rock. Where variations in sub-surface structure such as variable rock strata, ground water, sand, oil deposits, and the like are present, operation of the apparatus may be affected, as will subsequently be described, but is nevertheless usable in accomplishing its intended purposes.

The apparatus 10 is employed to locate and evaluate a geothermal source of energy, generally indicated at 20 in FIG. 4 which lies at depth in the earth's crust 11. Likely sites of such sources are initially located by finding vents in the earth's surface 12, such as geysers, fumaroles, and the like of sufficient character to indicate by experience that a commercially significant geothermal source may lie in the earth's crust somewhere in the vicinity. A borehole 21 is drilled in the crust 11 by any suitable means to a sufficient depth that temperature variations at the earth's surface are of negligible effect at the bottom of the borehole. Experience indicates that the depth may vary from 10 to 100 feet below the surface, depending upon the environmental conditions at the surface, although even much greater depths may be utilized if desired. The borehole has a lower end 22 and an upper end 23. In order to determine the proper depth to drill the borehole, sample temperature readings can be taken at the lower end of the borehole by presently available devices. When the borehole has been drilled to a sufficient depth, a core sample is taken from the lower end of the borehole for examination. The sample is analyzed to determine its thermal and electrical conductivity and the results recorded in order to establish an index for evaluating subsequent readings with the apparatus. The borehole is preferably substantially vertically disposed and in any event constitutes an axis of reference with respect to which the azimuthal orientation of the source 20 is to be determined.

An electrically insulated bore casing 30 is inserted in the borehole 21 so that it extends from the upper end 23 to a point immediately adjacent to the lower end 22 thereof. An electrode 31 is then inserted into the lower end of the borehole and is electrically connected to the surface 12 by a lead wire 32 extending through the insulated bore casing. The wire is electrically connected to a source of electrical energy 33 through a voltage regulator 34. The regulator is adapted to be adjusted to vary or terminate the flow of voltage from the source through the wire to the electrical conductor 31 at the lower end of the borehole. For convenience, the regulator is mounted in a control unit 35 positioned above the upper end of the borehole, as shown in FIG. 1. Obviously, the electrode may be battery actuated in situ, if desired.

A plurality of surface electrodes 40 are mounted on the earth's surface 12 in spaced relation in an annular arrangement concentrically about the upper end 23 of the borehole 21. For best results, experience has shown that the electrodes should be uniformly spaced. Similarly, the distance from each of the electrodes to the borehole should be approximately one-half the length of the borehole. Eight such surface electrodes disposed in the pattern shown in FIG. 2 are usually best suited for use, as will be made more clearly apparent.

The apparatus 10 further includes an ammeter recorder 41 which, for convenience, is mounted with the voltage regulator 34 in the control unit 35. The ammeter recorder has a plurality of individual metering units 42 corresponding in number to the surface electrodes 40 which are capable of individually registering the amperage received by the surface electrodes. Each unit has a pen 43 which is adapted to record minute variations in electrical amperage on a tape 44 for use in analysis. Furthermore, each unit has an adjustment mechanism 45 which is individually operable to control the sensitivity of the unit to amperage variation. Such ammeter recorders are commercially available and not described in greater detail herein. Electrical conductors 46 individually extend from each of the surface electrodes to its respective metering unit for the transmission of electrical energy therebetween. The parallel metering units and their respective surface electrodes are then connected to the source of electrical energy 33 by line 47, as shown in FIG. 3 so as to complete a circuit through the voltage regulator 34 which may also serve as a switch for the described circuit.

Upon installation of the apparatus 10, as above described, the voltage regulator 34 is operated to deliver electrical current from the source 33 through the lead wire 32 to the electrode 31 at the lower end 22 of the borehole 21. The electrical current is discharged from the conductor into the earth's crust 11. The current is conducted by the soil or rock away from the electrode and dispersed in all directions through the crust. It should be noted that the amperage is lessened the farther it is transmitted in any given direction due to further dispersal of the current and to the natural resistivity of the crust. The current reaching the earth's surface is received by the electrodes 40 and transmitted through the conductors 46 to the ammeter recorder 41. It, of course, may be amplified, if desired, by any suitable means. Each ammeter operates to record on its tape 44 through the use of the pen 43 the amperage received from its electrode, thereby establishing a stabilized record or model study of the characteristics of electrical conduction through the earth's crust in the area of the borehole.

It should be noted that the voltage regulator 34 and the adjustment mechanism 45 of each individual metering unit 42 are individually adjustable so that discharge and receipt of electrical current can be adjusted during such a preliminary operation for establishing a stable basis by which to judge subsequent changes in electrical conductivity. Thus, the voltage regulator can be adjusted to control the number of volts of electrical energy discharged from the borehole electrode 31. Each metering unit can be adjusted to sensitivity so as precisely to register the amperage received from each of the electrodes. If preferred, the metering units can be so adjusted that they record the same initial level since comparative changes provide the basis for azimuthal location. Similarly, it will be apparent that if the currents received by the electrode 40 are particularly weak, provision can be made for uniform individual amplification of the currents received to facilitate recording without disturbing the subsequent analysis.

Subsequently, a cryogenic material 50, such as liquid nitrogen or liquid helium, is injected by any suitable means into the lower end of the borehole 21. The amount of material injected is preferably recorded for purposes of later analysis. The ambient temperature of the surrounding crust adjacent to the lower end of the borehole causes the cryogenic material to boil off over a period of time so as to cool the surrounding crust below ambient temperature. A sphere of cooling 51 is thereby established about the lower end of the borehole. During the period of cooling, the conduction of electrical current through the sphere of cooling is increased since conduction of electrical energy through a given medium improves with a decrease in temperature. Consequently, the amperage received by each electrode 40 and recorded by each metering unit 42 increases during such cooling.

Depending upon the location of the geothermal source of energy 20 relative to the lower end 22 of the borehole 21, the sphere of cooling is not concentric to the lower end but rather is eccentric thereto so as to be canted away from the geothermal source. In other words, the temperature of the earth in the general direction of the geothermal source is not cooled as readily, if at all, due to the increased temperature in the direction of the geothermal source. Therefore, the electrodes 40 farthest from the geothermal source receive somewhat greater current than those closest to the geothermal source because the current received by the electrodes relatively farther from the source is traveled through a greater amount of cooled crust having enhanced conductivity. The results of such reception are recorded on the tapes 44 so as to provide a record for analysis. The discharge of electrical current from the electrode at the lower end 22 of the borehole is continued as long as the cryogenic material 50 is boiling off and until the temperature at the lower end is returned to ambience. The positioning of the electrodes in a circular pattern gives a range of readings indicating the cant of the sphere of cooling and perhaps equally significantly the azimuthal location of the area of most rapid warming after the cryogenic material has dissipated.

If the tape 44 indicates that the sphere of cooling was canted in a given direction, the geothermal source 20 is located in the reciprocal direction. Obviously, this determination is of primary significance. However, further knowledge can be extrapolated. The specific heat of the previously obtained core sample, the conductivity of the core sample, the readings of the tape 44, and the amount of cryogenic material boiled off in a given period of time are then analyzed. A comparison of these factors with the results of pre-conducted model studies, discloses the location and depth of the geothermal source and whether or not it possesses proper qualitative and quantitative characteristics to make it feasible for commercial use.

Variations on the above-described method of operation can be employed to assist in locating and analyzing the geothermal source 20. Two or more concentric rings of electrodes 40 can be established relative to the upper end 23 of the borehole 21. Such an arrangement gives a greater variety of readings with respect to the sphere of cooling and thereby provides greater insight to the location and qualitative and quantitative characteristics of the geothermal source. While a single ring of electrodes provides good azimuthal location of the geothermal source, a plurality of such rings make possible an analysis of the angle of declination of the source in the plane of the azimuth. Another variation calls for the drilling of several boreholes for use in the manner already described so as to give several locations for obtaining readings on the location of the geothermal source. The utilization of two or more such additional locations permits a precise determination of the location of the geothermal source by trigonometric calculation or plotting.

The presence of such sub-surface phenomena as ground water, oil deposits, sand, and the like in the location in which the borehole 21 is drilled affects the readings recorded by the ammeter recorders 41 due to the differences in electrical conductivity through such phenomena. However, these differences in electrical conductivity of such phenomena are substantially constants and therefore remain the same regardless of how many readings are taken. By comparing changes in electrical conductivity through the sphere of cooling with the readings of the model studies, the direction of the source of heat is readily determinable even through one or more of the paths is inherently more conductive than the others due to the existence of sub-surface phenomena. Additionally, when the readings appear to indicate the presence of such a condition, several new sites in the vicinity can be established and readings taken in order more precisely to determine the location of the geothermal source relative to the sub-surface phenomena. Furthermore, location and analysis of such phenomena are of value in determining where commercial drilling should be conducted in order to avoid their interfering with the operation.

DESCRIPTION OF A SECOND FORM

Figure 5:
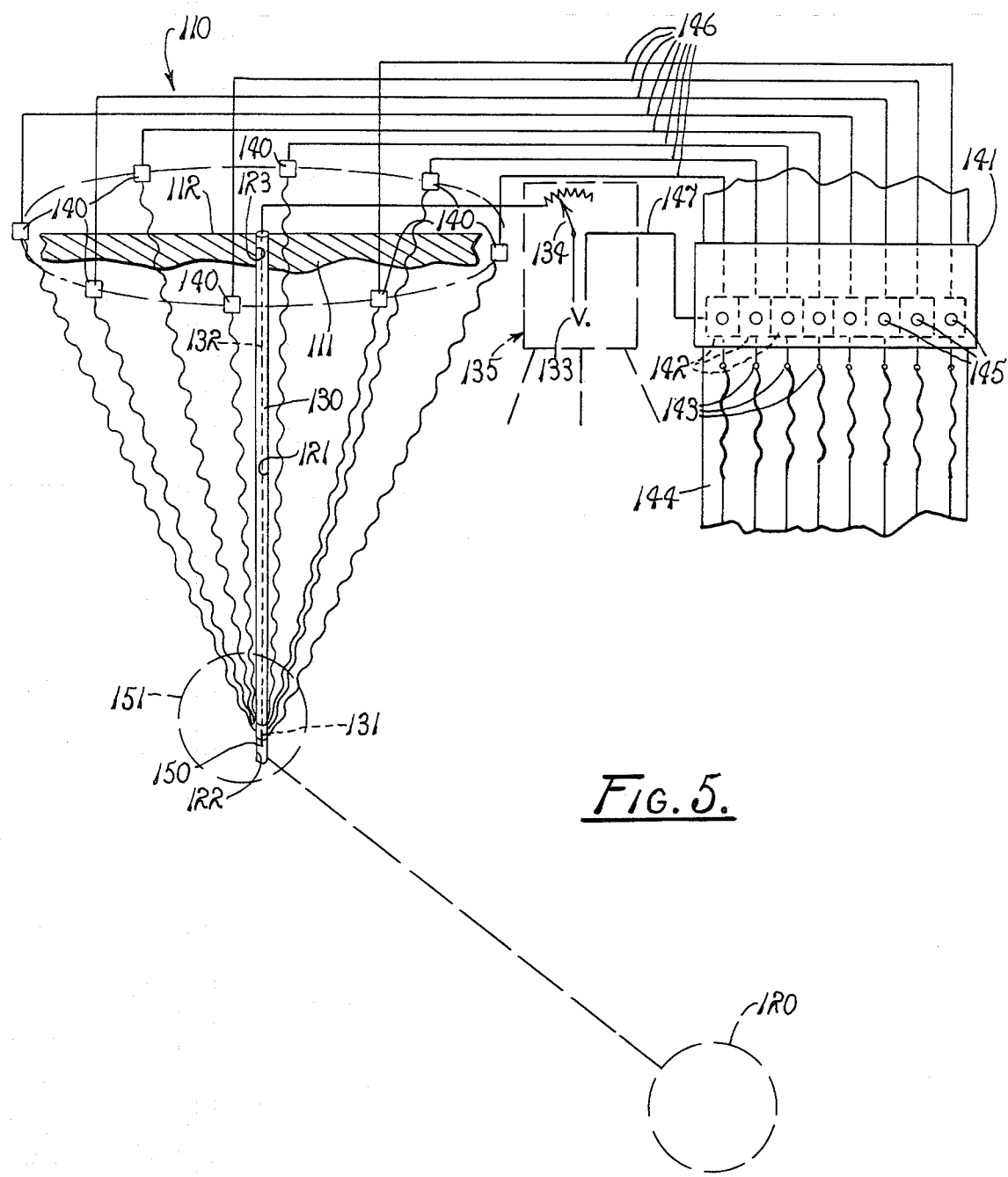
FIG. 5 is a schematic diagram of the apparatus of the second form of the invention showing the electrical circuit thereof for the detection of investigative information.

A second form of method and apparatus for locating geothermal sources of energy is shown schematically in FIG. 5 and generally indicated by the numeral 110. The second form of apparatus is positioned in the earth's crust 111 disposed on and closely adjacent to the earth's surface 112 substantially as in the first form of apparatus 10, as best shown in FIGS. 1, 2 and 4. The goal is, as with the first form of the invention, to locate and analyze a geothermal source of energy 120 located somewhere at depth in the earth's crust. However, unlike the first form of the invention, the second form of the invention is designed to utilize compression waves in the form of vibratory energy or sound in locating and evaluating a geothermal source of energy. The transmission of compression waves through the earth's crust for evaluation is the operational goal. The frequency of the compression waves employed, of course, determines whether the waves are audible sound or merely vibratory energy. It will be recognized that other forms of energy, such as radio-active energy, can be employed in place of the electrical energy of the first form of the invention and the compression waves of the second form of the invention. However, the first and second forms are the preferred forms of the invention.

A suitable site is selected by locating vents in the earth's surface 112 of a sufficient character to indicate by experience that a commercially significant geothermal source may be present. A borehole 121 is drilled in the crust 111 by any suitable means to a sufficient depth that temperature variations at the earth's surface are of negligible effect at the bottom of the borehole. As shown in FIG. 5, the borehole has a lower end 122 and an upper end 123. Subsequently a core sample is taken from the lower end of the borehole for examination. The sample is analyzed to determine its thermal and compression wave conductivity. The results of this analysis are then recorded to establish a model for the evaluation of the subsequent readings to be taken with the apparatus 110.

A bore casing 130 is then inserted into the borehole 121 so as to extend from the upper end 123 of the borehole to a position adjacent to the lower end 122 thereof. The bore casing is constructed so as to be insulated against compression waves transmitted through the earth's crust 111. A suitable sound or compression wave generating device 131 is positioned at the lower end of the borehole. The device can be of any suitable type, several of which are conventionally available, such as a piezoelectric or magnetostrictive transducer, preferably adapted to transimit a single pulse of compression waves on command. It is, of course, not necessary that the device be electrically actuated since all that is required is in this form of the invention is the emission of compression waves. However, for convenience and control, an electrically actuated device is preferred.

A lead wire 132 is operatively connected to the wave generating device 131 at the lower end 122 of the borehole 121 and is extended through the bore casing and connected to a source of electrical energy 133 through a control 134. The control can be of any suitable type depending upon the particular form of wave generating device employed. Where the generating device is only capable of producing compression waves of a fixed magnitude, the control need only be an on-off switch. However, where the device employed is capable of producing a range of magnitudes of waves, the control should be of variable adjustment such as the rheostat or voltage regulator, shown in FIG. 5. In this case the control is adapted to be adjusted to vary or terminate the flow of voltage from the source through the lead wire to the wave generating device so as to permit precise control of the magnitude of compression waves produced. For convenience, the control is mounted in a control unit 135 positioned above the upper end 123 of the borehole, as that shown in FIG. 1, with respect to the first form of the apparatus 10. Alternatively, as with the first form of the apparatus, the wave generating device 131 can be battery actuated at the lower end of the borehole, if desired.

A plurality of surface receiving devices 140, such as geophones or receiving transducers, are mounted on the earth's surface 112 in spaced relation in a circular arrangement concentrically about the upper end 123 of the borehole 121. The apparatus has a sound or compression wave recording device 141, such as a seismic recorder, which may for convenience be mounted with the control 134 in the control unit 135. The recording device has a plurality of individual recording units 142 corresponding in number to the receiving devices 140 which are capable of individually registering and rating the compression waves detected by the receiving devices. More importantly, each recording unit is capable of recording the precise instant in time at which the compression waves are first detected by its respective receiving device. Each of the recording units has a pen 143 which is adapted to record the precise time of detection as well as minute variations in the waves detected by its respective receiving device on a tape 144 for use in subsequent analysis. As in the first form of the apparatus, each recording unit has an adjustment mechanism 145 which is individually operable to control the sensitivity of the unit to the perception of the waves detected by its respective receiving device.

Electrical conductors 146 individually extend from each of the receiving devices to its respective recording unit 142 of the wave recording device 141 for the transmission of a wave signal therebetween. An electrical line 147 interconnects the parallel recording units and the source of electrical energy 133, as shown in FIG. 5 so as to complete a circuit through the control 134, which also may serve as a switch for the described circuit, as previously described.

The method employed in the operation of the apparatus 110 is substantially as described in regard to the first form of the apparatus 10. The wave generating device 131 is operated to discharge a pulse of compression waves in the form of vibratory energy or sound through the earth's crust 111 for detection by the receiving devices 140. The precise time of transmission is noted. The recording device 141 records the precise time the waves are detected by each of the receivers as well as the variations, as previously described. Since the precise times of transmission and detection of the waves are recorded, the velocity of the waves through the crust at each receiving device is calculated and the variations analyzed for the establishment of a model study for purposes of comparison.

Subsequently a cryogenic material 150, such as liquid nitrogen or liquid helium, is injected by any suitable means into the lower end 122 of the borehole 121. The cryogenic material causes the temperature of the crust surrounding the cryogenic material to be brought below ambient temperature so as to establish a sphere of cooling 151 about the lower end of the borehole. The lowering of the temperature of a material conversely raises the density thereof. Thus, the velocity of the passage of the compression waves through the earth's crust for detection by the receiving devices 140 is slowed due to the increase in density of the earth's crust by a reduction in the temperature thereof.

Depending upon the location of the geothermal source of energy 120 relative to the lower end 122 of the borehole 121, the sphere of cooling 151 is eccentric to the lower end of the borehole in a direction away from the geothermal source, as described in regard to the first form of apparatus 10. Since, as described, a lowering of the temperature of the crust accordingly lowers the velocity of the compression waves transmitted through the crust, such eccentricity of the sphere of cooling causes the receiving device 140 farthest from the geothermal source to detect compression waves emitted from the generating device 131 later than the receiving device closest to the geothermal source. The intermediate receiving devices, of course, detect the waves at an instant in time between these two extremes. As with the first form of the apparatus 10, the results are recorded on the tape 144 for subsequent analysis as described in regard to the first form of the apparatus. The various alternative methods employed with the first form of the invention in collecting and analyzing the information received also can be employed with the second form of the apparatus.

The method and apparatus of the first and second forms of the present invention thereby provide a commercially feasible mode of locating, and qualitatively and quantitatively analyzing sources of geothermal energy at a minimum cost and expenditure of time. Consequently, vast new reserves of potential electrical energy can be located and made available for use.

Although the invention has been shown and described in what is conceived to be the most practical and preferred method and apparatus, it is recognized that departures may be made therefrom within the scope of the invention, which is not to be limited to the illustrative details disclosed.

Having described my invention, what I claim as new and desire to secure by Letters Patent is:

1. A method of locating a source of geothermal energy comprising establishing a plurality of paths of electrical conduction through the earth, artificially changing the temperature of the earth in at least a part of said paths, and detecting changes in electrical conductivity along said paths incident to changes in temperature therealong to locate said source.

2. The method of claim 1 in which the detection of changes in electrical conductivity is carried out at a position remote from the part of said paths in which the temperature is changed.

3. A method of locating a source of geothermal energy comprising conducting test energy along a plurality of comparative paths through the earth, the rate of conductivity of said test energy being responsive to temperature change, removing heat from the earth at a position in predetermined relation to said paths, and measuring the energy conducted along said paths as said position is permitted to return to ambient temperature to locate said source.

4. The method of claim 3 in which said paths are symmetrical to the position from which heat is removed.

5. A method of locating a source of geothermal energy comprising establishing a plurality of comparative paths of electrical conductivity through the earth, removing heat from the earth at a position in predetermined relation to said paths, and measuring the electrical conductivity along said paths as said position is permitted to return to ambient temperature to locate said source.

6. The method of claim 5 in which said paths are symmetrical to the position from which heat is removed.

7. A method of locating a subterranean source of geothermal energy comprising discharging electrical energy into the earth at a position having sufficient depth that the surface effects of the atmosphere and solar radiation are negligible; detecting such energy at a plurality of positions at the surface in substantially equally spaced relation to the position of the discharge of electrical energy into the earth to determine the relative conductivity of the earth between said discharging position and the detecting positions; removing heat from the earth at said discharging position; and detecting changes in the conductivity of the earth between said discharge position and the detecting positions incident to temperature variation to locate said source.

8. The method of claim 7 in which the detection of energy at the plurality of positions is performed by electrodes individually operatively mounted at each of the positions to receive and transmit such energy for measurement.

9. The method of claim 8 in which the measurement of electrical energy is performed by ammeters individually in operative communication with each of the electrodes.

10. A method of locating a subterranean source of geothermal energy comprising drilling a hole into the earth to a depth sufficient that the surface effects of the atmosphere and solar radiation are negligible at the bottom of the hole, discharging electrical energy into the earth at the bottom of said hole, detecting such energy at the surface of the earth at a plurality of positions in substantially equally spaced relation about a circle concentric to said hole whereby the conductivity of the earth between the bottom of the hole and each of said positions is measured, depositing a heat absorbing agent at the bottom of the hole to cool the earth substantially symmetrically thereabout, and measuring the conductivity of the earth between the bottom of the hole and each of said positions to detect any distortion of the symmetrical cooling about the bottom of the hole incident to the receipt of geothermal energy from eccentrically thereof to locate said source.

11. The method of claim 10 in which, prior to the discharge of electrical energy into the earth, a core sample is taken from the bottom of the borehole for analysis as to thermal and electrical conductivity so as to establish an index for subsequent analysis of the changes in conductivity due to cooling.

12. The method of claim 10 in which a plurality of boreholes are drilled in spaced relation to a suspected location of a source of geothermal energy and the method employed at each such hole so as to permit precise location of the source relative to the bottoms of the boreholes.

13. The method of claim 10 in which the borehole is insulated from conducting electrical energy during the discharge of electrical energy into the earth in order to insure lateral discharge of the electrical energy.

14. An apparatus for locating a source of geothermal energy in the earth into which a borehole has been drilled comprising means for releasing electrical energy in the borehole, means at the surface for detecting electrical current at positions spaced about the borehole and variations in said current, and means for changing the temperature of the earth within the borehole and beneath the surface whereby the conductivity through the earth between the position of release of electrical energy in the borehole and the positions of detection of electrical energy at the surface can be compared and their rates of change by geothermal warming observed.

15. The apparatus of claim 14 in which the means for releasing electrical energy is an electrode to which an electrical potential is applied.

16. The apparatus of claim 15 in which the means for changing the temperature of the earth about the borehole comprises means for releasing cryogenic material into the borehole at the position of release of electrical energy.

17. The apparatus of claim 16 in which the detecting means comprises means individual to each position for visually displaying the amount of current received at the position and the individual means are mounted in a battery for simultaneous observation and analysis.

18. A method of locating a source of geothermal energy in the earth comprising establishing a plurality of paths of test energy conduction through the earth, said test energy being characterized by variations in the rate of conductivity thereof in response to temperature changes along the paths, artificially changing the temperature of the earth at a position in predetermined relation to the paths, and detecting changes in the rate of conductivity of the test energy along said paths incident to changes in temperature therealong to locate said source.

19. An apparatus for locating a source of geothermal energy in the earth into which a borehole has been drilled comprising means for releasing test energy in the borehole transmissible through the earth, means at the surface for detecting such test energy at positions spaced about the borehole, and means for changing the temperature of the earth within the borehole and beneath the surface whereby the conductivity of the test energy through the earth between the position of release of the test energy in the borehole and the positions of detection at the surface can be compared and their rates of change incident to geothermal warming observed.

20. The apparatus of claim 19 in which the energy releasing means releases electrical energy and the detection means detects such electrical energy.

21. The apparatus of claim 19 in which the energy releasing means releases energy in the form of compression waves transmitted through the earth and the detection means detects such energy.

* * * * *

UNITED STATES PATENT OFFICE
CERTIFICATE OF CORRECTION

Patent No. 3,805,587     Dated April 23, 1974

Inventor(s) Wayne L. Sayer

It is certified that error appears in the above-identified patent and that said Letters Patent are hereby corrected as shown below:

In the Specification:

Col. 1, line 27 after "gravitational" and before "can" delete "outlfow" and insert ---outflow---.

Col. 4, line 48 after "end" and before "of" insert ---22---.

Signed and sealed this 10th day of September 1974.

(SEAL)
Attest:

McCOY M. GIBSON, JR.
Attesting Officer

C. MARSHALL DANN
Commissioner of Patents